United States Patent [19]

Garoff et al.

[11] Patent Number: 5,135,899
[45] Date of Patent: Aug. 4, 1992

[54] METHOD FOR THE ACTIVATION OF A CARRIER FOR A POLYMERIZATION CATALYST, AND A CATALYST COMPONENT OBTAINED USING THE METHOD

[76] Inventors: Thomas Garoff, Borgströminkuja 4 K 104,, SF-00840 Helsinki; Timo Leinonen, Hamarin koulu,, SP-006650 Hamari, both of Finland

[21] Appl. No.: 354,347

[22] Filed: May 19, 1989

[30] Foreign Application Priority Data

Jun. 3, 1988 [FI] Finland ................................ 882626

[51] Int. Cl.$^5$ ..................... B01J 27/135; B01J 27/138; B01J 31/06
[52] U.S. Cl. ..................................... 502/105; 502/120; 502/123; 502/125; 502/127; 502/134; 502/439
[58] Field of Search ............... 502/439, 527, 226, 105, 502/120, 123, 125, 127, 134

[56] References Cited

U.S. PATENT DOCUMENTS

| | | | |
|---|---|---|---|
| 3,549,091 | 12/1978 | Slepetys | 241/5 |
| 3,595,486 | 7/1971 | Stephanoff | 241/5 |
| 3,726,484 | 4/1973 | Schurr | 241/5 |
| 4,224,189 | 9/1980 | Scholten et al. | 502/439 X |
| 4,350,612 | 9/1982 | Greco et al. | 502/439 X |
| 4,495,167 | 1/1985 | Nauroth et al. | 423/339 |
| 4,693,990 | 9/1987 | Hiroyuki et al. | 502/127 X |
| 4,811,907 | 3/1989 | Niemi et al. | 241/5 |

FOREIGN PATENT DOCUMENTS

| | | |
|---|---|---|
| 1110308 | 4/1968 | United Kingdom . |
| 1226420 | 3/1971 | United Kingdom . |
| 2111855 | 7/1983 | United Kingdom . |

*Primary Examiner*—W. J. Shine
*Attorney, Agent, or Firm*—Banner, Birch, McKie & Beckett

[57] ABSTRACT

The invention relates to the improving of a particle structure of carrier compounds for polymerization catalysts, and thereby to the improving of the activity of the entire catalyst, by jet grinding one or more carrier compounds (4), or a mixture of the same, in a grinding chamber in which one or more gas jets (2) transport particles (4) of the material to be ground finely, at such a force against each other and/or against one or more anvils (5) of the jet mill that the particles are pulverized into a finely-divided chemically active carrier.

25 Claims, 3 Drawing Sheets

METHOD FOR THE ACTIVATION OF A CARRIER FOR A POLYMERIZATION CATALYST, AND A CATALYST COMPONENT OBTAINED USING THE METHOD

FIELD OF THE INVENTION

The invention relates to a method for the activation of a carrier for a polymerization catalyst, wherein one or several solid carrier compounds for catalysts are finely ground, possibly together with one or more activating auxiliary agents and/or catalyst components, and to a catalyst component prepared using the method.

BACKGROUND OF THE INVENTION

In the production of heterogenous polymerization catalysts it is conventional to use for improving the polymerization activity of catalysts an inert carrier compound on which the actual catalytic component is formed. Among such carrier compounds there are both chemically inert carriers and carriers which have reactive chemical groups on their surface or within the carrying structure. Magnesium compounds, such as its oxides, oxy-halides and halides have proven to be important carrier compounds, the last-mentioned, especially $MgCl_2$, having recently become the most important carrier compounds for isospecific catalysts.

The activity and stereospecificity of a catalyst greatly depends on the morphology of the carrier compound, i.e. on how the active groups of the catalyst component, deposited on the surface of the carrier, can settle in positions effective in terms of activity and stereospecificity. Although sufficiently fine comminution of the carrier improves the activity significantly, the shape of the carrier particles, determined by the structure of their crystal lattice, also has a great effect on the activity of the catalyst. Efforts have been made to control and improve this particle structure by both physical and chemical means. Magnesium halides have been prepared, for example, from organic Mg compounds such as Grignard reagents, which have been halogenated by various methods and in the presence of various auxiliary agents.

The carrier may also be ground by different methods, for example in a ball mill, to obtain the desired crystal structure. In such a case a magnesium halide, especially MgCl, is ground in a ball mill together with an electron donor and possibly other compounds, even with the final catalyst components, for example for 50–120 hours at a temperature of 40°–70° C. As the result of the ball mill grinding there is typically obtained a finely-divided powder which has a large specific surface area and the particles of which have a deformed crystal lattice. When the powder is activated, for example by deposition by means of a transition metal compound and by reducing it by means of an organometal compound, a very active polymerization catalyst is obtained. However, a catalyst such as this, not having been treated further, has a disadvantage in its relatively low stereospecificity, and a polypropylene prepared by using the catalyst may, for example, contain an amorphous atactic fraction in a proportion up to 50%.

Thus, the carrier-grinding methods according to the state of the art are very slow and expensive and do not always lead to a suitable combination of catalyst activity and stereospecificity.

SUMMARY OF THE INVENTION

It is an object of the present invention to provide a new grinding method and catalyst component. eliminating the said disadvantages. The invention is thus mainly characterized in what is stated in the characterizing clause of the patent claims. It has thus been discovered that, in order to obtain an improved activity and stereospecificity for a catalyst, the crystal structure of the catalyst carrier can be improved by means of a jet mill in which the carrier particles, mixed with a gas jet, are ground in a new manner, which is more rapid and more effective than previously. Carrier particles mixed with the gas jet impinge in the grinding chamber against each other or against an anvil in the grinding chamber, the anvil being of a material harder than the carrier particles, for example of metal. The carrier particles are mixed with the jet either before being fed into the grinding chamber, or they are fed directly into gas jets inside the grinding chamber.

The apparatus used in the method according to the invention is of the jet mill type commonly used in the art, and its general principles are presented below.

The feeding in of the particles is carried out, for example, by allowing the particles to flow by gravity from a funnel and by using a screw conveyor as an auxiliary. The mixing with the jet before it enters the grinding chamber can be enhanced by an ejection effect.

The shape of the grinding chamber can in general be selected freely, but for practical reasons, the following solutions are often arrived at:

(1) If an anvil is used in the grinding chamber, a gas jet which contains particles is injected at one or several points at one end of a cylindrical chamber, the jet being aimed at the anvil or anvils.

(2) If two or several jets which contain particles are impacted against each other, the injection points of the jets are placed symmetrically in the walls of the cylindrical grinding chamber.

(3) The jet or jets can also be introduced tangentially in relation to the wall of the grinding chamber, whereby the gas flow which contains particles is brought into a rotary circulatory motion which may, the chamber being in the vertical position, descend spirally downwards under gravity. In this case the rotating of the gas flow can be regulated, and/or the grinding can be enhanced, by means of auxiliary jets coming from the lower section and by means of possible baffles and/or anvils.

(4) If the particles to be ground are introduced directly into the grinding chamber, the gas jets, of which there are preferably at least two, are aimed at the center of the approximately cylindrical grinding chamber, the particles to be ground being also fed centrally by allowing them to flow from a funnel or by means of a screw conveyor.

If one or several parallel jets or anvils are used, the gas flow and the ground particles are discharged at one or several points behind or next to the anvils. If a disc mill operating according to the vortex flow principle is used, or if the particles are fed directly into the grinding chamber, the gas flow is usually discharged centrally from the upper section of the chamber, and the ground particles from the upper and/or lower section. When gas jets are used into which solid particles have been added, either before the injection into the grinding chamber or directly in the grinding chamber, the discharge points are selected rather freely, but so that an optimal grinding result is obtained.

At a point subsequent to the grinding chamber the discharging particles can, furthermore, be fed into a classifying apparatus in which the particles which have possibly been left too coarse are screened off as being unsuitable for the preparation of an active catalyst.

Examples of the jet mill types suitable for the method according to the present invention include the jet and anvil mill, the material and fluid energy jet mill, the disc, or vortex, jet mill, and the fluid energy jet mill.

The method according to the invention can be used for increasing, by grinding, the activity of all kinds of solid polymerization catalysts and polymerization catalyst components. One important area of application is the grinding of Ziegler-Natta, i.e. coordination catalysts and catalyst components. In this case it is advantageously the catalyst carrier, either alone or together with electron-donor-like activating agents and possibly with activating catalyst components, that is subjected to the grinding. In the case of non-stereospecific olefin polymerization, it is possible to use both chemically inert carrier compounds, such as polyolefins like polyethylene and polypropylene, which are preferably of the same polymer type as the polymer to be prepared, graphite, soot or polystyrene, and carrier compounds which have on their surface chemical groups such as silica, aluminum oxide, magnesium oxide, titanium oxide, calcium chloride or sodium chloride, or have within their structure reactive groups, such as Mg(OH)Cl and polymers which have reactive OH—, NH$_2$—, COOH—, etc. groups. The oxides, oxy-halides and halides of magnesium (such as MgBr$_2$ and MgCl$_2$) have proved to be important carrier compounds, the last-mentioned of them, specifically MgCl$_2$, having proved to be usable as carrier compounds for isospecific carrier catalysts for olefin polymerization.

According to one preferred embodiment of the invention, magnesium chloride can be ground alone, together with an electron donor compound and possibly with other agents which increase the specific surface area and modify the crystal lattice, or, in addition to the above-mentioned agents, together with an active catalyst component such as titanium tetrachloride. Esters, ethers and diamines of organic acids are preferred electron donor compounds. The esters of aromatic acids, such as di-isobutyl phthalate, are especially advantageous. The method according to the present invention is thus applicable to the treatment of all types of heterogenous polymerization catalysts when such treatment will improve the activity of the catalyst. However, the method is especially advantageous for the treatment of a carrier compound, such as magnesium chloride, for a Ziegler-Natta catalyst; the changing of the morphology of such a carrier compound is an absolute prerequisite for effective and stereospecific polymerization.

The following figures present a number of jet mill types usable in the method according to the present invention.

DETAILED DESCRIPTION OF THE FIGURES

Figure 1:
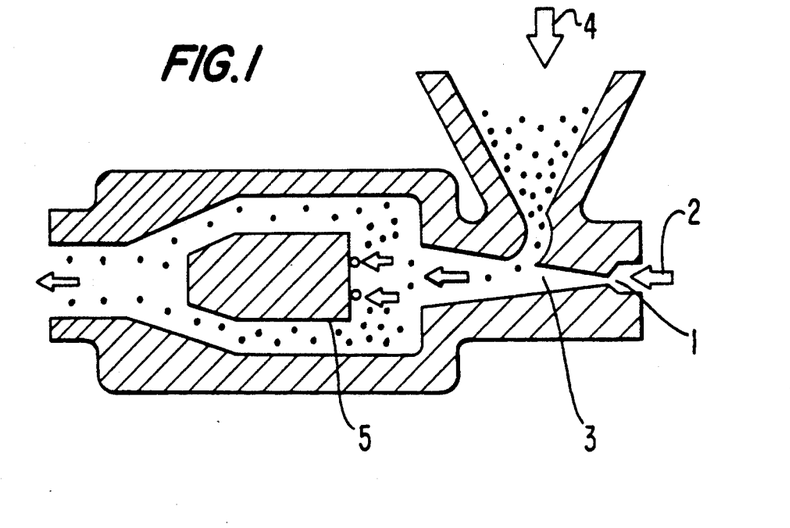
FIGS. 1–4 depict four different jet mill models which can be used in the method according to the invention.

The jet mill type depicted in FIG. 1 is fluid energy operated. The model shown in the figure has only one venturi nozzle 1. An accelerated gas flow 2 is introduced into an ejector-type feeder means 3, in which the material 4 is absorbed into the gas stream. After leaving the ejector 3, the gas and material flow is allowed to impinge against an anvil 5, whereby the material is ground. The ground material discharges through the opening shown on the left in the figure, behind the anvil 5.

Figure 2:
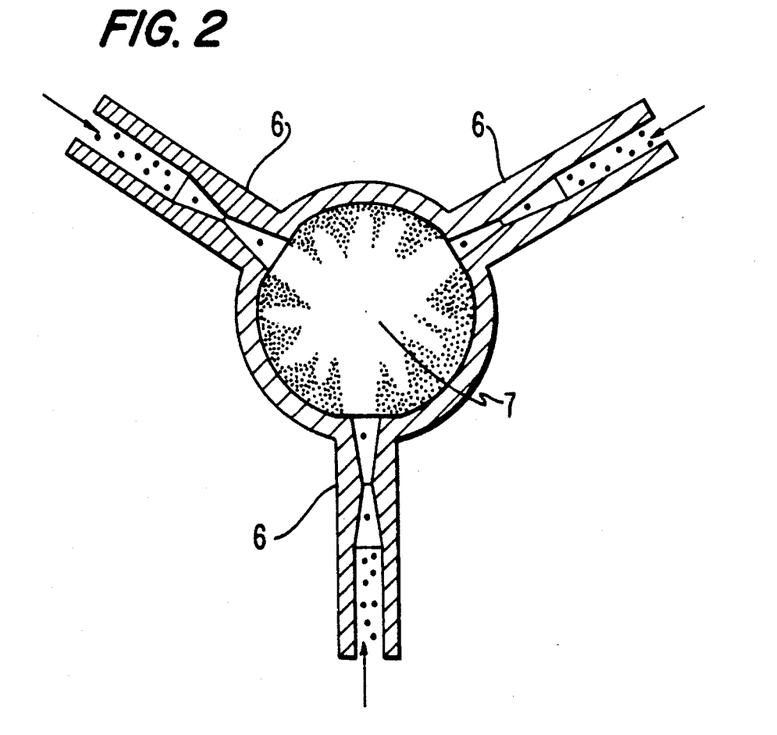

In the jet mill depicted in FIG. 2, both the material and the gas are accelerated in the same venturi (laval) nozzle 6. The gas and the material to be ground are first mixed in a pressurized pre-mixing unit, which is not shown in the figure. Thereafter the gas and mass flow is fed into a division unit, which divides the flow into one or more flows of equal magnitude. These flows are each fed into a separate venturi nozzle 6 shown in the figure. In the nozzles 6 the velocity of the gas and material flow increases up to a level above the velocity of sound. The nozzles 6 are oriented towards each other so that between the nozzles there is formed an impingement zone in the actual grinding chamber 7. If the nozzles number two, they are oriented so in relation to each other that the gas flows cannot clog the opposite nozzle, i.e. the nozzles are not aimed at each other but are at a slight angle to each other. If the nozzles number three, the most preferable arrangement is the 120° angle between the nozzles, shown in the figure.

Figure 3:
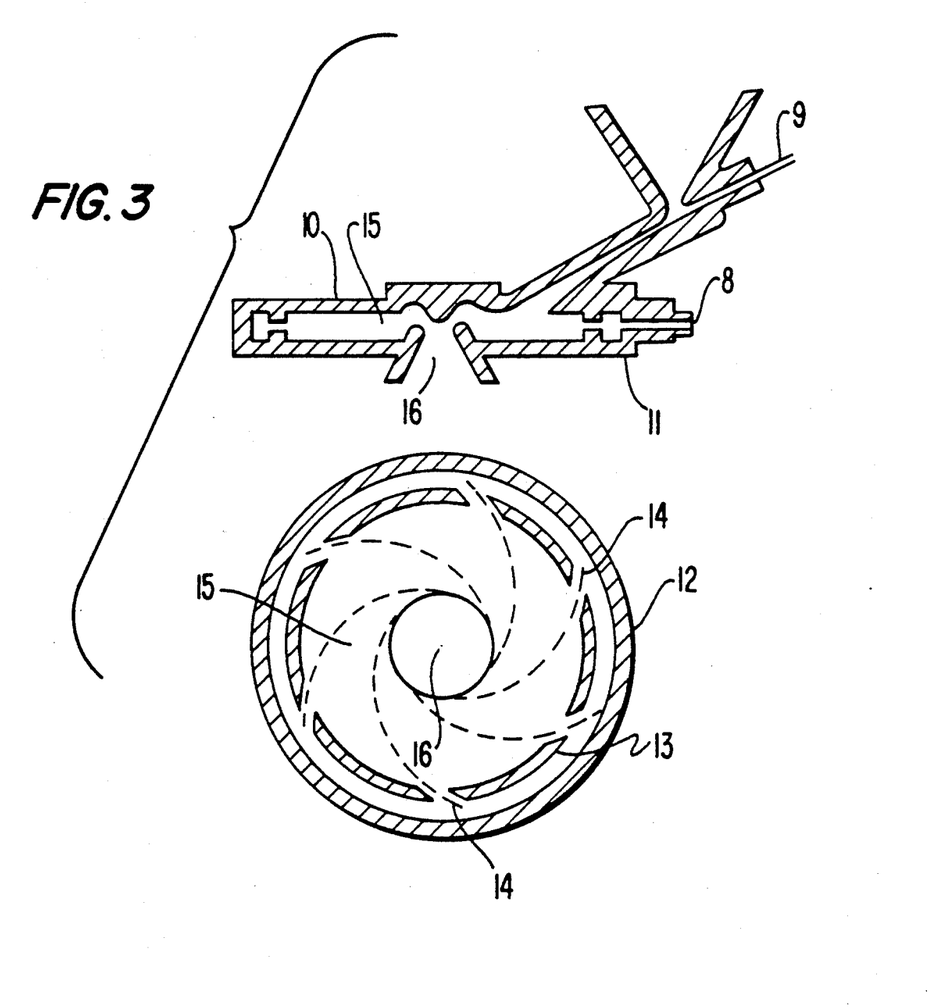

In the disc, or vortex, jet mill depicted in FIG. 3, the gas is fed into a disc-shaped grinding chamber 15 via two routes. One gas flow is a so-called working gas flow 8 and the other is a so-called ejector gas flow 9. The disc jet mill itself is made up of two plates, the upper plate 10 and the lower plate 11. Between the plates there are two rings, the outer ring 12 and the inner ring 13. To the inner ring 13 there is tangentially placed throughput openings 14. The gas flow is adjusted so that in the ejector gas line 9 there prevails an overpressure in relation to the working gas line 8. The ejector gas 9 absorbs material fed from the ejector and feeds it further tangentially into the grinding chamber 15, which is the space left inside the inner ring 13. The working gas flow 8 is directed between the rings 12 and 13, from where it discharges tangentially through the openings 14 in the inner ring into the grinding chamber 15. The tangentially fed gas flow produces in the grinding chamber 15 a strong rotary motion in the gas and mass flow. The rotary motion produces an annular impinging zone in the grinding chamber 15 inside the inner ring 13. The flow made up of the gas and the ground mass discharges from the disc jet mill through a central outlet 16.

Figure 4:
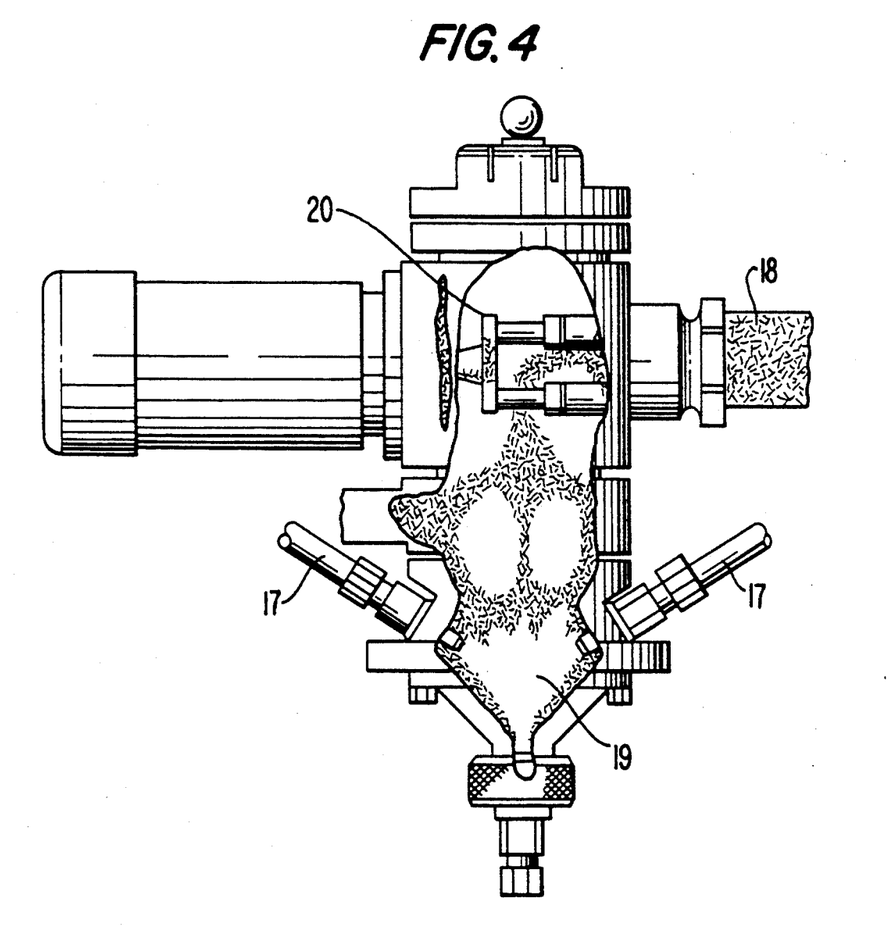

In the fluid energy model depicted in FIG. 4, only the gas is accelerated in a venturi nozzle 17. The material to be ground is fed into the gas jet after the acceleration. Thereafter, the material is impacted, as in the previous case, against itself in the impingement zone formed between the nozzles. The material is fed into the grinding chamber by means of a screw conveyor 18. Upon entering the chamber, the material falls into the impingement zone 19 of the gas jets. The particles are accelerated by the rapid gas flow between the nozzle and the impingement zone. Often there is further installed in the upper section of the impingement chamber a rapidly rotating classifier wheel 20, which ejects the coarse material back into the chamber but allows fine material through. The rotating classifier wheel 20 does not take part in the grinding process itself.

EXAMPLES

1. Preparation of a catalyst

Unless separately mentioned in the examples, the catalysts were prepared according to the instructions given below.

An amount of 0.1 mol of material treated in a jet mill is weighed for the preparation of a catalyst. If the material involved is magnesium chloride, this means 9.53 g of the material. The weighing is carried out in an inert space, preferably a nitrogen cabinet. In the inert space the material is placed into a glass reactor of approximately one liter. The reactor is closed before it is taken out of the nitrogen cabinet. It is provided with an agitator, a vertical cooler and an adjustable nitrogen-feeding line.

Into the reactor there are added, under agitation, first 300 ml of heptane and then, under slow agitation, 300 ml of titanium tetrachloride. The adding takes place at room temperature. Finally 4.2 ml of di-isobutyl phthalate is added in drops, under continuous agitation. The temperature is raised slowly to 100° C., and the solution is agitated continuously. An oil bath is preferably used for the heating. When the desired temperature has been reached, the solution is maintained at that temperature for an hour. Then the oil bath is removed and the agitation is discontinued. The catalyst is allowed to settle on the reactor bottom, whereafter the titanium tetrachloride/heptane solution is siphoned off as precisely as possible, so that mainly catalyst remains in the reactor.

Subsequently, a new 300-ml batch of titanium chloride is added under vigorous agitation strongly, and the oil bath is re-installed. The agitation is maintained continuously. The temperature is raised slowly to 110° C., at which temperature the titanium tetrachloride is allowed to reflux for an hour. Thereafter the agitation is discontinued and the oil bath is removed. The catalyst is allowed to settle on the reactor bottom, and the unreacted titanium tetrachloride is siphoned off as precisely as possible, so that in the main only catalyst is left in the reactor.

An amount of 300 ml of washing heptane is added, under agitation, into the reactor containing unwashed catalyst. The oil bath is installed, and the temperature of the solution is raised until the heptane refluxes mildly at a temperature of approximately 90°-100° C. After approximately 15 minutes of refluxing, the agitation is discontinued, the oil bath is removed, and the catalyst is allowed to settle. Then the washing heptane is siphoned off as precisely as possible, so that in the main only catalyst is left in the receptor. The catalyst is washed six more times, the last time without heating.

After the heptane washes, the catalyst is dried by means of a nitrogen gas flow. The catalyst yield is determined by weighing the recovered amount of catalyst, and the titanium content of the catalyst is determined.

b. Test polymerization

Test polymerization of both ethylene and propylene carried out using the catalysts prepared according to the examples. The polymerizations were carried out using the following procedure.

Test polymerization of ethylene

Three-liter reactors were used for the test polymerization of ethylene. Two liters of pentane, which acts as a medium in slurry polymerization, is first added into the reactor. The pentane medium has been purified by means of active aluminum oxide and a molecular sieve. Depending on the activity of the catalyst, 30–300 mg of the catalyst is fed into the reactor from the feeding ampoule. To promote the feeding, also 30 ml of pentane is added into the feeding ampoule. The ampoule is connected to the reactor, and the catalyst batch is injected into the reactor by means of a gas flow. The cocatalyst used is triethyl aluminum, of which 5 ml is fed into the reactor as a 10-percent solution.

The polymerization is started by filling the reactor with a monomer gas mixture having a total pressure of 15 bar. The monomer gas mixture contains hydrogen gas (5 bar), pentane gas (2–3 bar) which evaporates from the medium, and ethylene gas (7–8 bar). During the polymerization, more ethylene gas is fed into the reactor as the ethylene monomer is consumed in the polymerization reaction. Standard polymerization is carried out for 90 minutes at 90° C., whereafter the polymerization is discontinued, the reactor is opened, and the polymer is filtered out from the medium. After drying, the polymer is weighed.

Test polymerization of propylene

In the test polymerization of propylene, a three-liter bench reactor was used. The medium used is a heptane which has been dried using a molecular sieve, and it is added into the reactor in an amount of 1200 ml. The air is removed by bubbling nitrogen into the solution. The catalyst is used, depending on its activity, in an amount of 30–300 mg, which amount is weighed into a septum flask. The cocatalyst used is triethyl aluminum, which is added at such a ratio to the titanium present in the catalyst that the Al/Ti ratio will be 200. An external donor D2 is added at a ratio of Al/D2=20.

The indicated amounts of catalyst, aluminum alkyl and donor are fed into the feeding ampoule, which is connected to the reactor. In addition, 50 ml of heptane is added into the ampoule in order to promote the feeding. The feeding is carried out by means of a gas flow. Before the polymerization is started, hydrogen is added in order to produce the necessary partial pressure of hydrogen. The polymerization itself is carried out at a propylene monomer pressure of 10 bar and a temperature of 70° C., and its duration is three hours. Then the polymer is filtered out from the medium and is dried, whereafter the yield is determined.

c. Embodiment examples

Example 1

In this example, the material and fluid energy jet mill model depicted in FIG. 2 was used, the propelling gas being air. The pressure of the gas was 8 bar, and its temperature was 150° C. 16 kg of anhydrous magnesium chloride was treated in the jet mill. The material was run once through the jet mill. A catalyst was prepared from the ground material, according to the instructions given above. 9.522 g of the material was used for the preparation of the catalyst, and the yield was 16.6144 g of a catalyst which contained 3.6% titanium, 10.5% magnesium and 50% chlorine. 38.6 mg of this catalyst was used for a test polymerization which was carried out on propylene monomer according to the instructions given above. The yield was 2.5 g of polypropylene. The activity was thus 0.065 kgPP/g cat 2h, i.e. 1.8 kgPP/gTi 2h.

Example 2

The jet mill used in this example was of the same model as in Example 1 and the propelling gas was air, the pressure of which was 8 bar and temperature 150° C. 16 g of anhydrous magnesium chloride was treated in the jet mill. The material was run 7 times through the jet mill. A catalyst was prepared from the ground material, according to the instructions presented above. 9.522 g of the material was used for preparing the catalyst, and the yield was 6.00 g of a catalyst which contained 2.64% titanium, 21.8% magnesium and 76.25% chlorine. 33.0 mg of this catalyst was used for a test polymerization which was carried out on propylene monomer, according to the instructions given above. The yield was 15.0 g of polypropylene. The activity obtained was 0.145 kgPP/g cat 2h, i.e. 5.6 kgPP/gTi 2h.

Example 3

The jet mill used in the example was of the same model as in Examples 1 and 2, and the propelling gas was air. The pressure of the gas was 8 bar and its temperature was 150° C. 32 kg of anhydrous magnesium chloride was treated in the jet mill. The material was run five times through the jet mill. A catalyst was prepared from the ground material, according to the instructions given above. 9.522 g of the material was used for the preparation of the catalyst, and the yield was 9.7332 g of a catalyst which contained 3.95% titanium, 16.0% magnesium and 55.7% chlorine. 36.7 mg of the obtained catalyst was used for a test polymerization which was carried out on propylene monomer, according to the instructions given above. The yield was 7.2 g of polypropylene. The activity obtained was 0.20 kgPP/g cat 2h, i.e. 5.0 kgPP/gTi 2H.

Example 4

The jet mill used in this example as of the same model as in Examples 1-3, and the propelling gas used was nitrogen. The pressure of the gas was 10 bar, and its temperature was 10° C. 5.5 kg of anhydrous magnesium chloride was treated in the jet mill. The material was run 11 times through the jet mill. A catalyst was prepared from the thus obtained ground material, according to the instructions given above. 9.5740 g of the ground material was used for the preparation of the catalyst, and the yield was 10.2420 g of a catalyst, which contained 4.4% titanium, 14.3% magnesium and 60.0% chlorine. 40.4 mg of the catalyst was used for a test polymerization which was carried out on propylene monomer, according to the instructions given above. The yield was 4.0 g of polypropylene. The activity obtained was 0.10 kgPP/g cat 2 h, i.e. 2.3 kgPP/gTi 2H.

Example 5

The jet mill used in this example was of the same model as in Examples 1-4, and the propelling gas used was nitrogen. The pressure of the gas was 10 bar, and its temperature was 10° C. 10 kg of anhydrous magnesium chloride was treated in the jet mill. The material was run 10 times through the jet mill. A catalyst was prepared from the ground material, according to the instructions given above. 9.6696 g of the material was used for the preparation of the catalyst, and the yield was 10.9879 g of a catalyst which contained 4.8% titanium, 14.2% magnesium and 56.0% chlorine. 38.6 mg of the catalyst was used for a test polymerization which was carried out on propylene monomer, according to the instructions given above. The yield was 2.2 g of polypropylene. The activity obtained was 0.057 kgPP/g cat 2H, i.e. 1.19 kgPP/gTi 2H.

Example 6

The jet mill used in this example was of the same model as in examples 1-5, and the propelling gas used was nitrogen gas. The pressure of the gas was 14 bar, and its temperature was 150° C. 7.7 kg of anhydrous magnesium chloride was treated in the jet mill. The material was run 5 times through the jet mill. A catalyst was prepared from the ground material, according to the instructions given above. 9.5795 g of the material was used for the preparation of the catalyst, and the yield was 10.8617 g of a catalyst which contained 4.8% titanium, 16.0% magnesium and 54.0% chlorine. 37.7 mg of this catalyst was used for a test polymerization which was carried out on propylene monomer, according to the instructions given above. The yield was 4.1 g polypropylene. The activity obtained was 0.11 kgPP/g cat 2H, i.e. 2.29 kgPP/gTi 2H.

Example 7

The jet mill used in this example was of the same model as in Examples 1-6, and the propelling gas used was nitrogen. The pressure of the gas was 10 bar, and its temperature was −50° C. 5.0 kg of anhydrous magnesium chloride was treated in the jet mill. The temperature of the material was also −50° C., and it was run 4 times through the jet mill. A catalyst was prepared from the ground material, according to the instructions given above. 9.6432 g of the material was used for the preparation of the catalyst, and the yield was 11.7715 g of a catalyst which contained 4.9% titanium, 16.0% magnesium and 55.0% chlorine. 37.6 mg of this catalyst was used for a test polymerization which was carried out on propylene monomer, according to the instructions given above. The yield was 1.3 g of polypropylene. The activity obtained was 0.035 kgPP/g cat 2h, i.e. 0.7 kgPP/gTi 2H.

Example 8

The jet ill used in this example was of the same model as in Examples 1-7, and the propelling gas used was nitrogen. In this example, 4 mm laval nozzles (otherwise 3 mm) were used. The pressure of the gas was 10 bar, and its temperature was 190° C. 5.0 kg of anhydrous magnesium chloride was treated in the jet mill. The material was run twice through the jet mill. A catalyst was prepared from the ground material, according to the instructions given above. 9.5582 g of the material was used for the preparation of the catalyst, and the yield was 9.8930 g of a catalyst which contained 4.7% titanium, 17.0% magnesium and 58.0% chlorine. 39.7 mg of this catalyst was used for a test polymerization which was carried out on propylene monomer, according to the instructions given above. The yield was 1.9 g of polypropylene. The activity obtained was 0.048 kgPP/g cat 2h, i.e. 1.02 kgPP/gTi 2h.

Example 9

The jet ill used in this example was of the same model as in Examples 1-8, and the propelling gas used was nitrogen. The pressure of the gas was 10 bar, and its temperature was 220° C. 5.0 kg of anhydrous magnesium chloride was treated in the jet mill. The material was run nine times through the jet grinder. A catalyst was prepared from the ground material, according to the instructions given above. 9.5532 g of the material was used for the preparation of the catalyst, and the yield was 8.8722 g of a catalyst which contained 5.1% titanium, 16.0% magnesium and 56.0% chlorine. 35.4 mg of this catalyst was used for a test polymerization which was carried out on propylene monomer, according to the instructions given above. The yield was 7.5 g of polypropylene. The activity obtained was 0.21 kgPP/g cat 2h, i.e. 4.12 kgPP/gTi 2h.

Example 10

The jet mill used in this example was of the same model as in Examples 1-9, and the propelling gas used was nitrogen. The pressure of the gas was 7 bar, and its temperature was 70° C. 5.0 kg of anhydrous magnesium chloride was treated in the jet mill. The material was run twice through the jet mill. A catalyst was prepared from the ground material, according to the instructions given above. 9.5670 g of the material was used for the preparation of the catalyst, and the yield was 9.5235 g of a catalyst which contained 4.6% titanium, 13.8% magnesium and 55.8% chlorine. 137 mg of this catalyst was used for a test polymerization which was carried out on propylene monomer, according to the instructions given above. The yield was 16.9 g of polypropylene. The activity obtained was 0.12 kgPP/g cat 2h, i.e. 2.6 kgPP/gTi 2h.

Example 11

The jet mill used in this example was of the same model as in Examples 1-10, and the propelling gas used was nitrogen. The pressure of the gas was 10 bar, and its temperature was 10° C. 5.0 kg of anhydrous magnesium chloride was treated in the jet mill. The temperature of the material was −50° C. The material was run 7 times through the met mill. A catalyst was prepared from the ground material, according to the instructions given above. 9.5690 g of the material was used for the preparation of the catalyst, and the yield was 11.1627 g of a catalyst which contained 4.7% titanium, 12.9% magnesium and 54.2% chlorine. 201.4 mg of this catalyst was used for a test polymerization which was carried out on propylene monomer, according to the instructions given above. The yield was 18.7 g of polypropylene. The activity obtained was 0.093 kgPP/g cat 2h, i.e. 1.98 kgPP/gTi 2h.

Example 12

The jet mill used in this example was of the same model as in Examples 1-11, and the propelling gas used was nitrogen. The pressure of the gas was 10 bar, and its temperature was 10° C. 7.5 kg of an anhydrous magnesium chloride to which 900 g of silica had been added was treated in the jet mill. The material was cooled by means of liquid nitrogen, to a temperature of −150° C. The material was run 3 times through the jet mill. A catalyst was prepared from the ground material, according to the instructions given above. 9.6979 g of the material was used for the preparation of the catalyst, and the yield was 13.8535 g of a catalyst which contained 4.9% titanium, 11.0% magnesium and 46.0% chlorine. 188 mg of this catalyst was used for a test polymerization which was carried out on propylene monomer, according to the instructions given above. The yield was 27.5 g of polypropylene. The activity obtained was 0.15 kgPP/g cat 2h, i.e. 3.06 kgPP/gTi 2h.

Example 13 (Reproducibility example)

The jet mill used in this example was of the same model as in Examples 1-12, and the propelling gas used was nitrogen. The pressure of the gas was 10 bar, and its temperature was 220° C. 5.0 kg of anhydrous magnesium chloride was treated in the jet mill. The material was run 6 times through the jet mill. A catalyst was prepared from the ground material, according to the instructions given above. 9.6059 g of the material was used for the preparation of the catalyst, and the yield was 7.3232 g of a catalyst which contained 5.0% titanium, 14.2% magnesium and 54.0% chlorine. 127.1 mg of this catalyst was used for a test polymerization which was carried out on propylene monomer, according to the instructions given above. The recovery was 16.4 g of polypropylene. The activity obtained was 0.13 kgPP/g cat 2h, i.e. 2.6 kgPP/gTi 2h.

Example 14 (Reproducibility example)

The jet mill used in this example was of the same model as in Examples 1-13, and the propelling gas used was nitrogen. The pressure of the gas was 10 bar, and its temperature was 220° C. 5.0 kg of anhydrous magnesium chloride was treated in the jet mill. The material was run 6 times through the jet mill. A catalyst was prepared from the ground material, according to the instructions given above. 9.6663 g of the material was used for the preparation of the catalyst, and the yield was 13.3584 g of a catalyst which contained 4.7% titanium, 14.7% magnesium and 59.0% chlorine. 112.6 mg of this catalyst was used for a test polymerization which was carried out on propylene monomer, according to the instructions given above. The yield was 16.8 g of polypropylene. The activity obtained was 0.15 kgPP/g cat 2h, i.e. 3.2 kgPP/gTi 2h.

Example 15 (Reproducibility example)

The jet mill used in this example was of the same model as in Examples 1-14, and the propelling gas used was nitrogen. The pressure of the gas was 10 bar, and its temperature was 220° C. 5.0 kg of anhydrous magnesium chloride was treated in the jet mill. The material was run 6 times through the jet mill. A catalyst was prepared from the ground material, according to the instructions given above. 9.5301 g of the material was used for the preparation of the catalyst, and the yield was 8.9355 g of a catalyst which contained 4.8% titanium, 14.8% magnesium and 55% chlorine. 131.2 mg of this catalyst was used for a test polymerization which was carried out on propylene monomer, according to the instructions given above. The yield was 17.8 g of polypropylene. The activity obtained was 0.14 kgPP/g cat 2h, i.e. 2.9 kgPP/gTi 2h.

Example 16 (Reproducibility example)

The jet mill used in this example was of the same model as in Examples 1-15, and the propelling gas used was nitrogen. 5.0 kg of anhydrous magnesium chloride was treated in the jet mill. The material was run 6 times through the jet mill. A catalyst was prepared from the ground material, according to the instructions given above. 9.5938 g of the material was used for the preparation of the catalyst, and the yield was 10.3617 g of a catalyst which contained 4.8% titanium, 15.9% magnesium and 56.0% chlorine. 122.1 mg of this catalyst was used for a test polymerization which was carried out on propylene monomer, according to the instructions given above. The yield was 16.2 g of polypropylene. The activity obtained was 0.13 kgPP/g cat 2h, i.e. 2.7 kgPP/gTi 2h.

Example 17 (Catalytic synthesis of polypropylene)

The jet mill used in this example was of the same model as in Examples 1-16, and the propelling gas used was nitrogen. The pressure of the gas was 10 bar, and its temperature was 10° C. 2.1 kg of an anhydrous magnesium chloride to which 420 g of titanium tetrachloride and 610 g of di-isobutyl phthalate had been added was treated in the jet mill. The material was run twice through the jet mill. The yield was in total 4.5 kg of material. 202.2 mg of this catalyst was used for a test polymerization which was carried on propylene monomer, according to the instructions given above. The yield was 16.9 g of polypropylene. The activity obtained was 0.08 kgPP/g cat 2h, i.e. 7.0 kgPP/gTi 2h. The catalyst was also tested on ethylene, according to the instructions given above. The amount of catalyst used for the polymerization was 300 mg, and the yield was 63 g of polyethylene. The activity was thus 0.140 kgPE/g cat h.

Example 18 (Re-titanization)

A catalyst was prepared, according to the instructions given above, from the material obtained in Example 7. 9.59933 g of the material was used for the catalyst synthesis, and the yield was 6.0200 g of a catalyst which contained 0.63% titanium, 24.0% magnesium and 74.0% chlorine. 157.4 mg of this catalyst was used for a test polymerization which was carried out on propylene monomer, according to the instructions given above. The yield was 36.4 g of polypropylene. The activity obtained was 0.23 kgPP/g cat 2h, i.e. 36.5 kgPP/gTi 2h.

Example 19 (Catalytic synthesis of polyethylene)

The jet mill used in this example was of the same model as in Examples 1-18, and the propelling gas used was nitrogen. The pressure of the gas was 10 bar, and its temperature was 100° C. 2.5 kg of an anhydrous magnesium chloride to which 500 g of titanium tetrachloride had been added was treated in the jet mill. The material was run twice through the jet mill. The total yield of catalyst was 2.0 kg. 219.6 mg of this catalyst was used for a test polymerization which was carried out on propylene monomer, according to the instructions given above. The yield was 22.6 g of polypropylene. The activity obtained was 0.36 kgPP/g cat 2h, i.e. 50 kgPP/gTi 2h. The catalyst was also tested in ethylene polymerization. The amount of catalyst used for the polymerization was 300 mg, and the polymerization was carried out according to the instructions given above. The yield was 93.4 g of polyethylene, which corresponds to an activity of 0.207 kgPE/g cat h.

Example 20 (Re-titanization)

A catalyst was prepared according to the instructions given above from the material obtained in Example 19. The amount of material used for the catalyst synthesis was 9.5642 g, and the yield was 5.5855 g of a catalyst which contained 0.74% titanium, 23.0% magnesium and 74.9% chlorine. 118 mg of this catalyst was used for a test polymerization which was carried out on propylene monomer, according to the instructions given above. The yield was 63.3 g of polypropylene. The activity was 0.7 kgPP/g cat 2h, i.e. 100 kgPP/gTi 2h.

Example 21

The jet mill used in this example was of the disc, or vortex jet mill type depicted in FIG. 3, and the propelling gas used was nitrogen. The pressure of the gas was 8 bar, and its temperature was 10° C. 1.5 kg of anhydrous magnesium chloride was treated in the jet mill. The material was run 11 times through the jet mill. A catalyst was prepared from the ground material, according to the instructions given above. 4.0639 g of the material was used for the preparation of the catalyst, and the yield was 3.5755 g of a catalyst which contained 1.3% titanium, 23.5% magnesium and 67.5% chlorine. 268.9 mg of this catalyst was used for a test polymerization which was carried out on propylene monomer, according to the instructions given above. The yield was 181.8 g of polypropylene. The activity obtained was 0.68 kgPP/g cat 2h, i.e. 52 kgPP/gTi 2h. The catalyst was also tested on ethylene, whereupon the activity obtained was 1.9 kgPP/g cat h.

Example 22

The jet mill used in this example was of the same model as in Example 21, and the propelling gas used was nitrogen. The pressure of the gas was 10 bar, and its temperature was 10° C. 1.5 kg of anhydrous magnesium chloride was treated in the jet mill. The material was run 11 times through the jet mill. A catalyst was prepared from the ground material, according to the instructions given above. 6.7201 g of the material was used for the preparation of the catalyst, and the yield was 5.4090 g of a catalyst which contained 6.8% titanium, 10.1% magnesium and 48.1% chlorine. 37.2 mg of this catalyst was used for a test polymerization which was carried on propylene monomer, according to the instructions given above. The yield was 10.3 g of polypropylene. The activity obtained was 0.28 kgPP/g cat 2h, i.e. 4.1 kgPP/gTi 2h.

Example 23

The jet mill used in this example was of the same model as in Examples 21 and 22, and the propelling gas used was nitrogen. The pressure of the gas was 10 bar, and its temperature was 10° C. 1.5 kg of anhydrous magnesium chloride was treated in the jet mill. The material was run 20 times through the jet mill. A catalyst was prepared from the ground material, according to the instructions given above. 5.5820 g of the material was used for the preparation of the catalyst, and the yield was 7.6860 g of a catalyst which contained 6.4% titanium, 10.7% magnesium and 49.1% chlorine. 37.2 mg of this catalyst was used for a test polymerization which was carried out on propylene monomer, according to the instructions given above. The yield was 13.3 g polypropylene. The activity obtained was 0.36 kgPP/g cat 2h, i.e. 5.6 kgPP/gTi 2h.

Example 24

The jet mill used in this example was of the same model as in Examples 21-23, and the propelling gas used was nitrogen. The pressure of the gas was 10 bar, and its temperature was 100° C. 1.5 kg of anhydrous magnesium chloride was treated in the jet mill. The material was run 12 times through the jet mill. A catalyst was prepared from the ground material, according to the instructions given above. 2.6210 g of the material was used for the preparation of the catalyst, and the yield was 4.8380 g of a catalyst which contained 8.4% titanium, 6.5% magnesium and 42.4% chlorine. 61.0 mg of this catalyst was used for a test polymerization which was carried out on propylene monomer, according to the instructions given above. The yield was 5.9 g of polypropylene. The activity obtained was 0.11 kgPP/g cat 2h, i.e. 1.3 kgPP/gTi 2h.

Example 25

The jet mill used in this example was the fluid energy jet mill shown in FIG. 4, and the propelling gas used was nitrogen. The pressure of the gas was 4 bar, and its temperature was 10° C. 5 kg of anhydrous magnesium chloride was treated in the jet mill. The material was run once through the jet mill. A catalyst was prepared from the ground material, according to the instructions given above. 9.5321 g of the material was used for the preparation of the catalyst, and the yield was 10.7842 g of a catalyst which contained 4.6% titanium, 14.3% magnesium and 55.2% chlorine. 37.3 mg of this catalyst was used for a test polymerization which was carried out on propylene monomer, according to the instructions given above. The yield was 5.5 g of polypropylene. The activity obtained was 0.148 kgPP/g cat 2h, i.e. 3.2 kgPP/gTi 2h.

Example 26

The jet mill used in this example was of the same model as in Example 25, and the propelling gas used was nitrogen. The pressure of the gas was 4 bar, and its temperature was 10° C. 5 kg of anhydrous magnesium chloride was treated in the jet mill. The material was run 3 times through the jet mill. A catalyst was prepared from the ground material, according to the instructions given above. 9.2210 g of the material was used for the preparation of the catalyst, and the yield was 10.7345 g of a catalyst which contained 4.3% titanium, 13.9% magnesium and 54.9% chlorine. 39.2 mg of this catalyst was used for a test polymerization which was carried out on propylene monomer, according to the instructions given above. The yield was 5.9 g of polypropylene. The activity obtained was 0.150 kgPP/g cat 2h, i.e. 3.5 kgPP/gTi 2h.

Example 27

The jet mill used in this example was of the same model as in Examples 25 and 26, and the propelling gas used was nitrogen. The pressure of the gas was 4 bar, and its temperature was 10° C. 5 kg of anhydrous magnesium chloride was treated in the jet mill. The material was run 5 times through the jet mill. A catalyst was prepared form the ground material, according to the instructions given above. 9.7261 g of the material was used for the preparation of the catalyst, and the yield was 10.1341 g of a catalyst which contained 4.7% titanium, 15.2% magnesium and 57.3% chlorine. 40.2 mg of this catalyst was used for a test polymerization which was carried out on propylene monomer, according to the instructions given above. The yield was 5.9 g of polypropylene. The activity obtained was 0.146 kgPP/g cat 2h, i.e. 3.1 kgPP/gTi 2h.

Example 28

The jet mill used in this example was of the jet and anvil mill type depicted in FIG. 1, and the propelling gas used was nitrogen. The pressure of the gas was 6 bar, and its temperature was 10° C. 1.3 kg of anhydrous magnesium chloride was treated in the jet mill. The material was run once through the jet mill. A catalyst was prepared of the ground material, according to the instructions given above. 9.5011 g of the material was used for the preparation of the catalyst, and the yield was 10.3270 g of a catalyst which contained 4.4% titanium, 13.9% magnesium and 54.2% chlorine. 37.8 mg of this catalyst was used for a test polymerization which carried out on propylene monomer, according to the instruction given above. The yield was 6.2 g of polypropylene. The activity obtained was 0.164 kgPP/g cat 2h, i.e. 3.7 kgPP/gTi 2h.

Example 29

The jet mill used in this example was of the model depicted in FIG. 4, i.e. of the same model as was used in Examples 25-27, and the propelling gas used was nitrogen. The pressure of the gas was 6 bar, and its temperature was 10° C. 1.3 kg of anhydrous magnesium chloride was treated in the jet mill. The material was run three times through the jet mill. A catalyst was prepared from the ground material, according to the instructions given above. 9.5223 g of the material was used for the preparation of the catalyst, and the yield was 10.9327 g of a catalyst which contained 4.7% titanium, 14.3% magnesium and 55.2% chlorine. 39.2 mg of this catalyst was used for a test polymerization which was carried out on propylene monomer, according to the instructions given above. The yield was 4.7 g of polypropylene. The activity obtained was 0.120 kgPP/g cat 2h, i.e. 2.5 kgPP/gTi 2h.

Example 30

The jet ill used in this example was of the jet and anvil mill type depicted in FIG. 1, i.e. of the same type as in Example 28, and the propelling gas used was nitrogen gas. The pressure of the gas was 6 bar, and its temperature was 10° C. 1.3 kg of anhydrous magnesium chloride was treated in the jet mill. The material was run 5 times through the jet mill. A catalyst was prepared form the ground material, according to the instructions given above. 9.1109 g of the material was used for the preparation of the catalyst, and the yield was 10.2321 g of a catalyst which contained 5.0% titanium, 13.2% magnesium and 55.7% chlorine. 40.7 mg of this catalyst was used for a test polymerization which was carried out on propylene monomer, according to the instructions given above. The yield was 6.2 g of polypropylene. The activity obtained was 0.152 kgPP/g cat 2h, i.e. 3.0 kgPP/gTi 2h.

d. Reference example

In the reference example, untreated magnesium chloride was used, from which a catalyst was prepared according to the instructions given above. 9.5220 g of the material was used for the preparation of the catalyst, and the yield was 6.7920 g of a catalyst which contained 0.64% titanium, 24.3% magnesium and 69.2% chlorine. 168.6 mg of this catalyst was used for a test polymerization which was carried on propylene monomer, according to the instructions given above. The yield was 0 g of polypropylene, and so the activity obtained was 0 kgPP/g cat 2h, i.e. 0 kgPP/gTi 2h. The catalyst was also tested in ethylene polymerization. No polymer was obtained in this polymerization, either, and thus the ethylene activity was 0 kgPE/g cat h.

We claim:

1. A method for the activation of a polymerization catalyst comprising:

grinding a solid carrier material containing a catalytically active component for polymerizing polyolefins in a jet mill in which gas flows through one or more gas jets and transports particles of the material to be finely ground at such a force against each other and/or against one or more anvils of the jet mill that the particles are ground into a finely-divided, activated catalyst.

2. A method according to claim 1, characterized in that the solid carrier is a Mg halide.

3. A method according to claim 1, characterized in that the solid carrier material comprises polyethylene, polypropylene, graphite, soot, polystyrene, $SiO_2$, $Al_2O_3$, MgO, $TiO_2$, $CaCl_2$, NaCl, $MgBr_2$, $MgCl_2$, Mg(OH)Cl, or a polymer containing OH—, $NH_2$—, COOH—, or mixtures thereof.

4. A method according to claim 1 and further comprising:
mixing the particles with the gas flow before being fed into the grinding chamber,
splitting said gas flow into two or more gas jets;
impinging said two or more gas jets against each other to grind said particles.

5. A method according to claim 1 and further comprising:
introducing one or more gas jets into the grinding chamber to form a turbulent gas flow; and
feeding the particles of the material to be ground finely into the turbulent gas flow produced by the gas jets.

6. A method according to claim 1 wherein the grinding step comprises:
introducing one or more gas jets containing the particles to be ground into the grinding chamber where said one or more gas jets impinge against at least one anvil.

7. A method according to claim 1 wherein the grinding step comprises:
introducing one or more gas jets containing carrier particles to be ground tangentially into a round cylindrical grinding chamber so the gas jet forms vortex motion whereupon the particles are ground when impinging against each other and/or against any members placed in the chamber to guide the gas motion.

8. A method for activating a catalyst for olefin polymerization by a process comprising:
contacting a carrier comprising $MCl_2$ with $TiCl_4$ to form a precursor catalyst; and
grinding said precursor catalyst in a jet mill for a time sufficient to activate the catalyst for the polymerization of olefins.

9. A method according to claim 8 wherein the contacting step further includes contacting said precursor catalyst with di-isobutyl phthalate.

10. A method for activating a catalyst for the polymerization of olefins by a process comprising:
grinding a solid carrier selected from the group consisting of polyethylene, polypropylene, graphite, soot, polystyrene, $SiO_2$, $Al_2O_3$, MgO, $TiO_2$, $CaCl_2$, NaCl, a magnesium halide, Mg(OH)Cl, or a polymer containing OH—, $NH_2$—, COOH—, or mixtures thereof in a jet mill for a time sufficient to activate said carrier for the polymerization of olefins; and
contacting the activated carrier with a catalytic material that exhibits catalytic activity for the polymerization of olefins.

11. The method of claim 10 wherein said carrier comprises $MgBr_2$ or $MgCl_2$.

12. The method according to claim 11 wherein said carrier comprises $MgCl_2$.

13. The method of claim 12 wherein said carrier further comprises silica.

14. The method according to claim 10 wherein said compound that is catalytically active for the polymerization of olefins comprises titanium.

15. The method according to claim 14 wherein said compound comprises titanium tetrachloride.

16. The method according to claim 10 wherein the contacting step further comprises:
contacting said carrier with an electron doner activating agent comprising an ester, ether, or diamine of an organic acid.

17. The method according to claim 16 wherein said electron doner activating agent comprises di-isobutyl phthalate.

18. The method of claim 10 wherein the grinding step comprises:
entraining particles of said carrier in a moving gas stream;
accelerating said particles to a velocity of at least the speed of sound; and
directing the accelerated stream of particles so as to impact another stream or an anvil member inside said jet mill.

19. A polymerization catalyst comprising titanium tetrachloride on a finely divided magnesium chloride carrier, said magnesium chloride carrier having been ground by a process comprising grinding said magnesium chloride in a jet mill in which gas flows through one or more gas jets and transports particles of the material to be finely ground at such a force against each other and/or against one or more anvils of the jet mill that the particles are ground into a finely-divided, chemically activated carrier.

20. A catalyst for polymerizing olefins, said catalyst having been ground in a jet mill at a speed of at least the speed of sound and comprising a carrier comprising a magnesium halide and an active catalytic component comprising titanium tetrachloride.

21. The catalyst of claim 20 wherein said magnesium halide comprises $MgCl_2$.

22. The catalyst of claim 20 further comprising silica.

23. The catalyst of claim 20 further comprising a cocatalyst comprising triethyl aluminum.

24. The catalyst of claim 20 further comprising a stereospecificity-increasing electron doner agent comprising an ester, ether or diamine of an organic acid.

25. The catalyst of claim 25 wherein said doner agent comprises di-isobutyl phthalate.

* * * * *